(12) United States Patent
Pietropaolo (10) Patent No.: US 11,083,314 B2
(45) Date of Patent: Aug. 10, 2021

(54) DRINKWARE WITH LENS BASE (71) Applicant: George Pietropaolo, Penfield, NY (US)

(72) Inventor: George Pietropaolo, Penfield, NY (US)

( * ) Notice: Subject to any disclaimer, the term of this patent is extended or adjusted under 35 U.S.C. 154(b) by 0 days.

(21) Appl. No.: 16/073,136

(22) PCT Filed: Jan. 26, 2017

(86) PCT No.: PCT/US2017/015043
§ 371 (c)(1),
(2) Date: Jul. 26, 2018

(87) PCT Pub. No.: WO2017/132318
PCT Pub. Date: Aug. 3, 2017

(65) Prior Publication Data
US 2019/0038055 A1    Feb. 7, 2019

Related U.S. Application Data (60) Provisional application No. 62/287,168, filed on Jan. 26, 2016.

(51) Int. Cl.
*A47G 19/22* (2006.01)
*C03B 9/33* (2006.01)
(Continued)

(52) U.S. Cl.
CPC ......... *A47G 19/2227* (2013.01); *A47G 19/22* (2013.01); *C03B 9/33* (2013.01); *C03B 9/347* (2013.01); *G02B 25/002* (2013.01)

(58) Field of Classification Search
CPC ...... A47G 19/22; A47G 19/2227; C03B 9/33; C03B 9/347; G02B 25/002
(Continued)

(56) References Cited

U.S. PATENT DOCUMENTS 2,455,972 A    12/1948  Bowditch
3,028,035 A     4/1962  Leong
(Continued)

FOREIGN PATENT DOCUMENTS

WO    01/94894 A1    12/2001

OTHER PUBLICATIONS

International Search Report and Written Opinion of the International Searching Authority in corresponding International Application No. PCT/US17/15043, completed Mar. 28, 2017 (10 pages).

*Primary Examiner* — Marin Pichler
*Assistant Examiner* — Mitchell T Oestreich
(74) *Attorney, Agent, or Firm* — Andrew J. Anderson, Esq.; Harter Secrest & Emery LLP (57) ABSTRACT

A drinkware product includes a vessel container and a base having upper and lower surfaces and a periphery, wherein the base includes a transparent section extending through the base from the upper surface to the lower surface and having an optical surface providing a predetermined degree of magnification when viewed through the transparent section from the upper surface of the base. The optical surface providing a predetermined degree of magnification is positioned to provide at least one focal point under the base positioned between the periphery of the base and a central location of the base when viewed through the transparent section from the upper surface of the base. The vessel container may be formed by a sidewall extending up from the base at the periphery of the base, or may be an upper portion of a stemware with a stem extending between the base and upper portion. An existing product mold may be modified by either adding material to the mold or removing material from the mold to form a modified mold surface which will impart an optical surface to the base of a
(Continued)

stemware or other drinkware product formed with the modified mold.

15 Claims, 7 Drawing Sheets

(51) Int. Cl.
*C03B 9/347* (2006.01)
*G02B 25/00* (2006.01)

(58) Field of Classification Search
USPC .......................................................... 359/809
See application file for complete search history.

(56) References Cited

U.S. PATENT DOCUMENTS

| | | |
|---|---|---|
| 5,609,409 A | 3/1997 | Diehl |
| 5,772,065 A | 6/1998 | Kalamaras |
| 6,475,423 B1 | 11/2002 | Masterson et al. |
| 6,532,117 B2 | 3/2003 | Taylor |
| 6,793,362 B2 | 9/2004 | Tai |
| 7,273,147 B2 | 9/2007 | Willat et al. |
| 2003/0011897 A1 | 1/2003 | Knipping et al. |
| 2005/0132623 A1 | 6/2005 | Farmer et al. |
| 2006/0113693 A1 | 6/2006 | McBain et al. |
| 2007/0119726 A1 | 5/2007 | Willat et al. |
| 2009/0241601 A1* | 10/2009 | Balbi ...................... B08B 15/04 65/26 |
| 2014/0144804 A1 | 5/2014 | Roodnat et al. |
| 2016/0157645 A1* | 6/2016 | Bayless .............. A47G 19/2227 220/600 |

* cited by examiner

DRINKWARE WITH LENS BASE

FIELD

This invention is directed to stemware and other drinkware, particularly to stemware and other drinkware incorporating a magnifying lens feature therein, and to methods for modifying a mold for making such stemware and other drinkware.

BACKGROUND

Most restaurants use printed lists or menus of food and drinks available to customers. Some of these lists or menus of food and drink are sometimes displayed in large bold print and are relatively easy to read by all patrons. However, in some eating establishments, their lists or menus are printed in relatively small type. Also the lighting in such places may be insufficient so that some people cannot read the printed materials or read them with difficulty. In many restaurants the lighting is dimmed or candle light is used to impart a desirable atmosphere for the enjoyment of the patrons. This presents a problem even for many patrons having normal vision.

Restaurant patrons can be provided with a conventional magnifying device, such as a conventional magnifying lens, a Fresnel lens or other flat sheet type lens for the purpose of magnifying the print of the menus to facilitate reading thereof. But it is relatively easy for such a lens to become separated from the menu so that it is not readily available for use by the customer.

Certain prior art lens magnification systems for pamphlets or booklets such as restaurant menus enable a lens, such as a flat sheet lens, to be permanently attached to the menu structure and permit a customer to turn the pages of the booklet or menu so that the customer can use the lens for magnifying the print on all pages of a menu. Such attached magnifying lens systems, however, provide no other additional function for the magnifying lens.

U.S. Pat. No. 6,532,117 describes tableware items such as a plate, flatware, coaster, tray, bowl, dish or beverage container such as a cup, glass or mug, having a body and a magnifier on the body. While providing tableware items such as described therein may provide a conveniently located device for reading menus in a restaurant, there are further problems in that such items may not be easily modified to include a magnifying lens, or further may not be used simultaneously for both magnification and conventional use of the item (e.g., the presence of food on a plate, or beverage in a glass, may prohibit effective use of a lens contained in the tableware item under such food or beverage).

Further, there is a problem with the misreading of medicinal and prescription labels, as the instructions on the medicine and prescription bottles and containers are often too small to be easily read. While conventional magnification lenses may be employed to facilitate reading of such instructions, such conventional magnification lenses are frequently hard to handle, especially by the elderly, or may not be easily located by a user in association with the medicine or prescription to be taken. WO 01/94894 describes magnification measuring cup apparatus wherein the measuring cup contains a magnifying lens that is molded or manufactured into the base of the cup, for use with medicine bottles or prescription drug containers to facilitate reading of instructions contained with such medicines and prescriptions. The described cups are relatively small, e.g. designed to be positioned on top of a bottle, and may be relatively hard to handle when used as an optical device, and provide only a relatively limited field of view when used.

US 2016/0157645 describes stemware with magnifying base and light source, and illustrates a stemware base comprise a clear dome shaped magnifier. Such a magnifier will provide the focal point of the lens directly under a centrally placed stem of the described stemware, however, such that the stem will obscure the magnified image created by such base.

It accordingly would be desirable to provide a tableware item, and in particular a drinkware item, which may be conveniently modified so as to be able to be used as a magnifying device. It would be further desirable to provide such an item which in certain embodiments would enable simultaneous conventional use thereof in addition to use as a magnifying device. It further would be desirable to provide a stemware or other drinkware item which in certain embodiments may be useful for reading very fine print (e.g., less than or equal to about 8 pt, less than or equal to about 6 pt, or even less than or equal to about 4 pt print size) which may be used in prescription labels as well as more conventional reading print (e.g., about 9 pt and higher).

SUMMARY

The present disclosure, in certain aspects, describes a drinkware product comprising a vessel container and a base having upper and lower surfaces and a periphery; wherein the base includes a transparent section extending through the base from the upper surface to the lower surface and having an optical surface providing a predetermined degree of magnification when viewed through the transparent section from the upper surface of the base; and wherein the optical surface providing a predetermined degree of magnification is positioned to provide at least one focal point under the base positioned between the periphery of the base and a central location of the base when viewed through the transparent section from the upper surface of the base.

The present disclosure, in further aspects, describes a stemware product that comprises an upper portion, a base having upper and lower surfaces and a periphery, and a stem extending between the base and upper portion, where the stem is narrower than the periphery of the base and spaces the upper portion from the base such that the upper surface of the base is directly visible externally from the top portion, wherein the base includes a transparent section extending through the base from the upper surface to the lower surface and having an optical surface providing a predetermined degree of magnification when viewing through the transparent section from the upper surface of the base externally from the upper portion.

In one particular aspect, the upper portion comprises an upper container vessel or main reservoir connected to the stem, such as where the stemware product is a stemmed beverage glass, and more particularly a wine glass, a martini glass, a margarita glass, a champagne glass, or other similar glassware having a stem and a base. Optionally, the transparent section in the base may be clear or tinted a desired color. The upper portion and stem of the stemware may be clear (e.g. glass or crystal) or opaque, with or without ornamentation, design(s), and/or an identifying logo, trademark, or other indicia. In certain aspects a magnifying lens section is formed integrally in the base of the stemware. In other aspects a lens may be permanently secured in an opening through the base or may be releasably secured in such an opening. The lens itself may have indicia, etc. therein and/or thereon.

In further aspects, the disclosure is directed towards a method of modifying a mold for fabricating a stemware product, the method comprising: selecting an existing mold for forming a selected stemware product having an upper portion, a base having upper and lower primary surfaces and a periphery, and a stem extending between the base and upper portion, where the stem is narrower than the periphery of the base and spaces the upper portion from the base such that the upper surface of the base is directly visible externally from the top portion; and modifying the existing mold to either add material to the mold or remove material from the mold to form a modified mold surface which will impart an optical surface to the base of a stemware product formed with the modified mold.

In still further aspects, the disclosure is directed towards a method of forming a stemware product, the method comprising: selecting an existing mold for forming a selected stemware product having an upper portion, a base having upper and lower primary surfaces and a periphery, and a stem extending between the base and upper portion, where the stem is narrower than the periphery of the base and spaces the upper portion from the base such that the upper surface of the base is directly visible externally from the top portion; modifying the existing mold to either add material to the mold or remove material from the mold to form a modified mold surface which will impart an optical surface to the base of a stemware product formed with the modified mold; and using the modified mold to form a molded stemware product comprising an upper portion, a stem, and a base having a transparent section extending through the base from an upper surface to a lower surface thereof and having an optical surface providing a predetermined degree of magnification when viewing through the transparent section from the upper surface of the base externally from the upper portion.

BRIEF DESCRIPTION OF THE DRAWINGS

A more particular description of various embodiments of the disclosure briefly summarized above is provided by references to the embodiments which are shown in the drawings which form a part of this specification. These drawings illustrate certain embodiments and are not to be used to improperly limit the scope of the invention which may have other equally effective or legally equivalent embodiments.

DETAILED DESCRIPTION

The present disclosure will now be described more fully hereinafter with reference to the accompanying figures, where like numbers refer to like elements throughout. In the drawings, layers, regions, or components may be exaggerated for clarity. The method steps are not necessarily limited to the order in which they are set forth.

The present disclosure is directed to stemware and drinkware products with bases incorporating a transparent section having an optical surface providing a predetermined degree of magnification when viewing through the transparent section. The base comprises a substrate material that is transparent so that an image, such as printed text of a restaurant menu or wine list, or a prescription label, may be viewed through the base when the stemware or drinkware is positioned over the image. While any predetermined degree of magnification greater than 1× may be employed to improve viewing of an image through the base, in certain embodiments a predetermined degree of magnification of at least 1.1× is employed, and in further non-limiting embodiments at least 1.1× to at least 10×, including all values incremented by 0.1× over such range (e.g., in specific embodiments at least 1.2×, at least 1.3×, at least 1.5×, or at least 2.0×). In certain embodiments, the predetermined degree of magnification may vary over different portions of the base, and may include multiple predetermined degrees of magnification selected from such range and specific specified values.

The stemware and other drinkware can be formed from any suitable material including polymer and/or copolymer materials and blends and derivatives thereof, or glass materials. When employing polymer/copolymer materials, the stemware and other drinkware will typically be configured as multiple use stemware and other drinkware, or higher end stemware and other drinkware such as styrene stemware and other drinkware, as opposed to conventional single-use plastic ware. Certain embodiments of the present disclosure are more particularly directed to glass stemware and other drinkware. The terms "glass", "glassware", "glass stemware" and derivatives thereof, refer to any suitable glass substrate material that is typically frangible and translucent or transparent and also typically comprises silica materials. The glassware may include lead or be substantially lead free.

Figure 1:
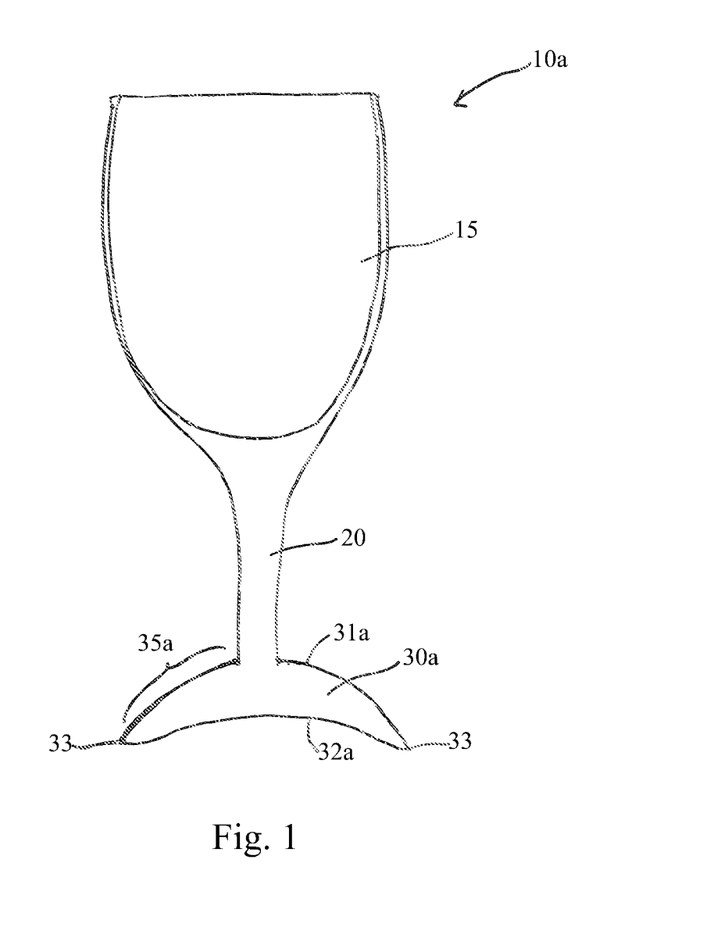
FIG. 1 is a cross-sectional view of one embodiment of a stemware product of the present disclosure.

FIG. 1 illustrates a cross-sectional view of one embodiment of a stemware product 10a having an upper portion in the form of a container or reservoir 15, with a stem 20 that terminates into a base 30a. The base 30a has opposing upper and lower primary surfaces, 31a, 32b respectively, and a periphery 33. Stem 20 is narrower than the periphery of the base, and spaces the upper portion 15 from the base 30 such that the upper surface 31 of the base is directly visible externally from the top portion 15. Base 30a includes at least a transparent section, such as in area 35a, extending through the base from the upper surface to the lower surface, which has an optical surface providing a predetermined degree of magnification when viewing through the transparent section from the upper surface of the base externally from the upper portion. The entire base 30a may be transparent, and the optical surface providing the predetermined degree of magnification may be provided by a predetermined curve in either of surfaces 31a or 32a, or combined predetermined curves in each of surfaces 31a and 32a. As further generally illustrated in FIG. 1, surfaces 31a and 32a of base 30a may be generally symmetrical around stem 20, such that such surfaces combine to form a generally symmetrical spherical lens centered around stem 20. While optical surfaces 31a and 32a are shown as smooth continuous optical surfaces, which may be preferred for esthetic reasons, faceted optical surfaces, such as provided in a Fresnel lens, may alternatively be employed as the optical surface if desired.

While a base in the form of a generally symmetrical spherical lens as illustrated in FIG. 1 may be useful for forming a predetermined degree of magnification for viewing images through the base, the focal point of such a lens will be under the base generally near the center of the base, and the presence of the stem in the center of the base may distort images positioned below the stemware under the center of the base near the focal point. Further, the spherical nature of the lens may also distort images positioned under the stemware closer to the periphery of the base. Additionally, it may further be desirable to provide a range of predetermined degrees of magnification when viewing through different portions of the base so as to provide a selectable degree of magnification for viewing. Accordingly, in further embodiments of the present disclosure, either or both of the upper and lower surfaces of the base may define aspherical or asymmetrical surfaces, including free-form optical surfaces, so as to provide a lens feature in the base which is more particularly designed to provide a predetermined magnification with less distortion of images viewed through the base, and/or to provide multiple transparent sections with different predetermined degrees of magnification which may be selected for use by a user of the stemware. In one embodiment, e.g., when the stem is attached to the base at a central location of the upper surface of the base, an optical surface of the base providing a predetermined degree of magnification may be positioned to provide at least one focal point under the base which is positioned between the periphery of the base and the central location.

More particularly, in accordance with various embodiments of the disclosure, the upper and lower surfaces of the base may be designed to provide an optical surface providing a predetermined degree of magnification which varies across the upper visible surface of the base to provide a plurality of focal points under the base of different predetermined degrees of magnification positioned across the upper visible surface of the base. Even more particularly, the optical surface providing a predetermined degree of magnification may vary continuously across at least a portion of the upper visible surface of the base to provide a continuously varying predetermined degree of magnification across the upper visible surface of the base, such as provided in progressive multifocal optical lenses.

Figure 2:
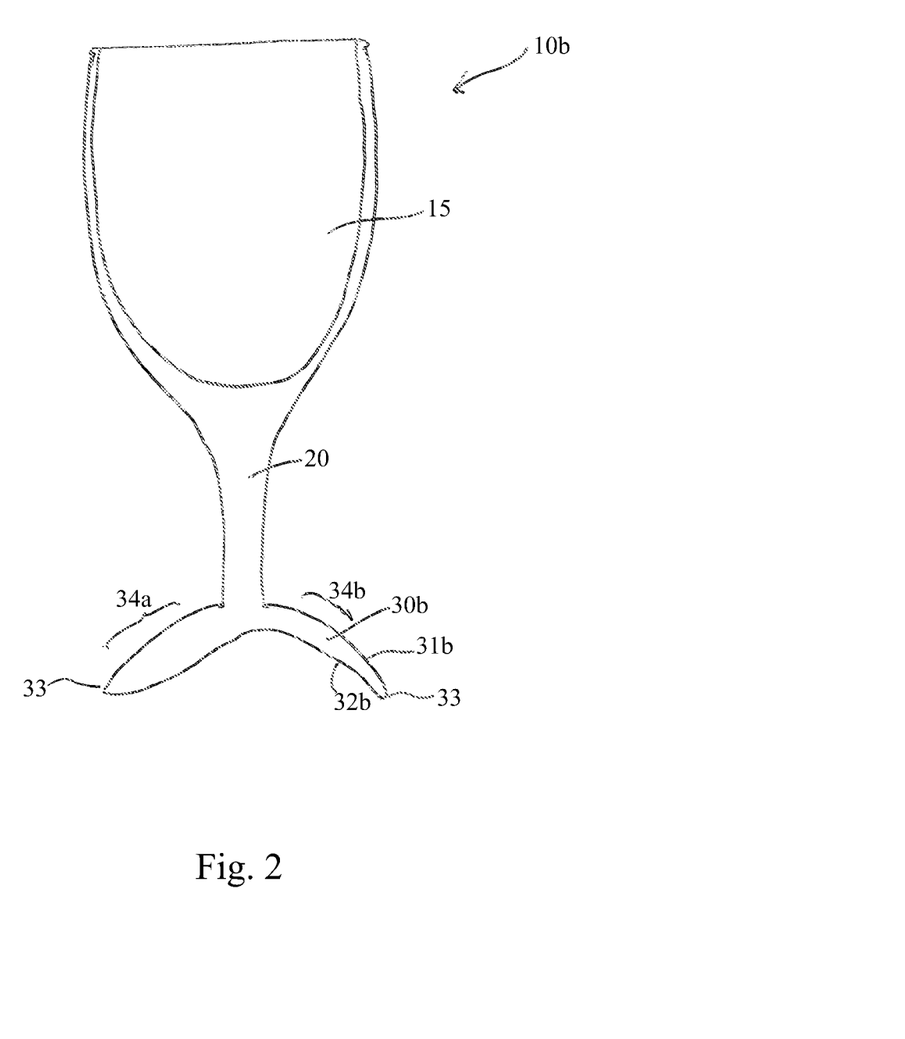
FIG. 2 is a cross-sectional view of a second embodiment of a stemware product of the present disclosure.

FIG. 2 illustrates a cross-sectional view of a particular embodiment of a stemware product 10b having an upper portion in the form of a container or reservoir 15, with a stem 20 that terminates into a base 30b. The base 30b has opposing upper and lower primary surfaces, 31b, 32b respectively, and a periphery 33. Stem 20 is narrower than the periphery of the base, and spaces the upper portion 15 from the base 30b such that the upper surface 31b of the base is directly visible externally from the top portion 15. In the embodiment of FIG. 2, while the stem 20 is attached to the base at a central location of the upper surface of the base similarly as in the embodiment of FIG. 1, surfaces 31b and 32b are not both spherically symmetrical, and rather are designed to provide an optical surface providing a predetermined degree of magnification which varies across the upper visible surface of the base, such that different predetermined degrees of magnification would be provided when viewing through positions 34a and 34b. While not specifically illustrated, the surfaces 31b and 32b may be further designed to provide a predetermined degree of magnification varying continuously between positions 34a and 34b when viewing through the base 30b at locations around the stem between such positions.

Figure 3:
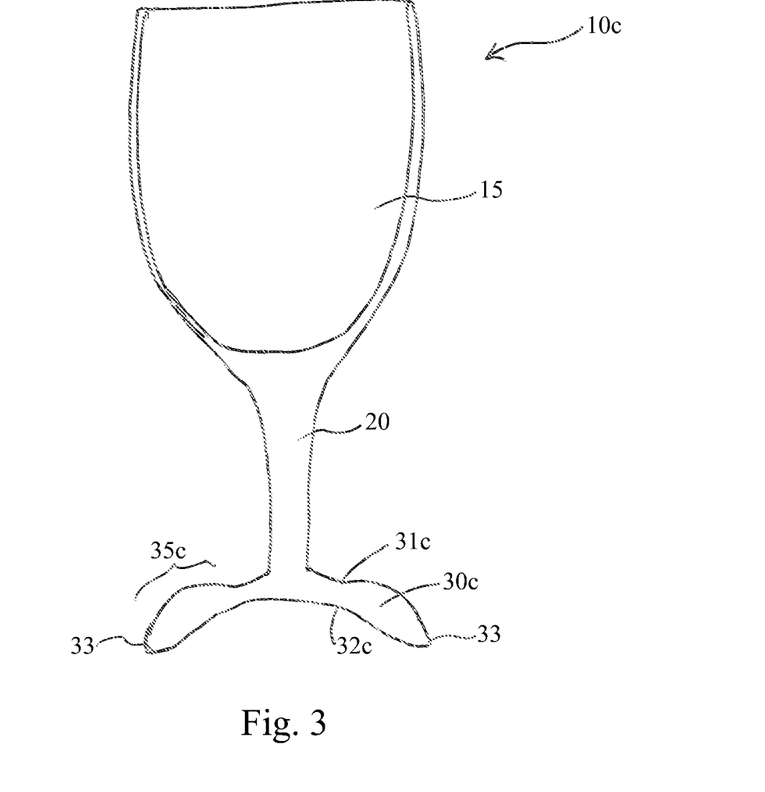
FIG. 3 is a cross-sectional view of a third embodiment of a stemware product of the present disclosure.

FIG. 3 illustrates a cross-sectional view of another particular embodiment of a stemware product 10c having an upper portion in the form of a container or reservoir 15, with a stem 20 that terminates into a base 30c. The base 30c has opposing upper and lower primary surfaces, 31c, 32c respectively, and a periphery 33. Stem 20 is narrower than the periphery of the base, and spaces the upper portion 15 from the base 30c such that the upper surface 31c of the base is directly visible externally from the top portion 15. In the embodiment of FIG. 3, while the stem 20 is attached to the base at a central location of the upper surface of the base similarly as in the embodiment of FIG. 1, surfaces 31c and 32c are designed to provide an optical surface providing a predetermined degree of magnification positioned to provide at least one focal point under the base positioned between the periphery of the base and the central location. More particularly, e.g., the upper surface 31c is curved to provide a bulging convex surface in area 35c intermediate the periphery and center of the base, such that the focal point for the lens feature formed by the bulging convex upper surface 31c and the corresponding lower surface 32c is between the periphery and the center of the base 30c. Alternatively or additionally, the lower surface 32c may be curved to provide a bulging convex surface intermediate the periphery and center of the base. Such bulging convex surface(s) may extend continuously or discontinuously rotationally around the central location of the base to provide a plurality of focal points positioned rotationally around the central location. Further, the predetermined degree of magnification provided by the optical surface may vary rotationally around the central location to provide a plurality of focal points under the base having different predetermined degrees of magnification positioned rotationally around the central location.

Figure 4:
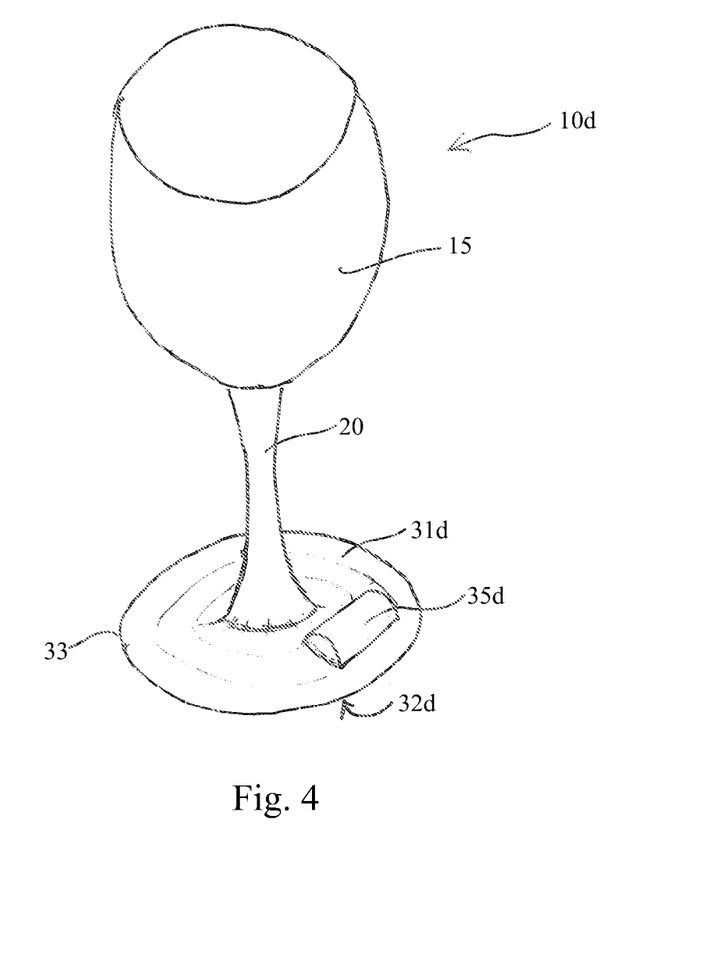
FIG. 4 is a perspective view of a fourth embodiment of a stemware product of the present disclosure.

FIG. 4 illustrates a perspective view of a further particular embodiment of a stemware product 10d, where either or both of the upper and lower surfaces 31d, 32d of the base 30d may be shaped to provide an optical surface providing a predetermined degree of magnification which defines a generally cylindrical lens portion 35d positioned to provide a focal line segment positioned between the periphery of the base and a central location of the base. More particularly, base 30d has opposing upper and lower primary surfaces, 31d, 32d respectively, and a periphery 33, wherein surfaces 31d and 32d are designed to provide a generally cylindrical lens portion 35d having an optical surface providing a predetermined degree of magnification positioned to provide at least one focal line segment positioned between the periphery of the base and the central location. Such generally cylindrical lens portion 35d may be particularly advantageous, e.g., for reading lines of text though the base of the stemware with decreased distortion. Multiple cylindrical lens portions may be formed around the stem intermediate the stem and the periphery of the base, with similar or different predetermined degrees of magnification.

Figure 5:
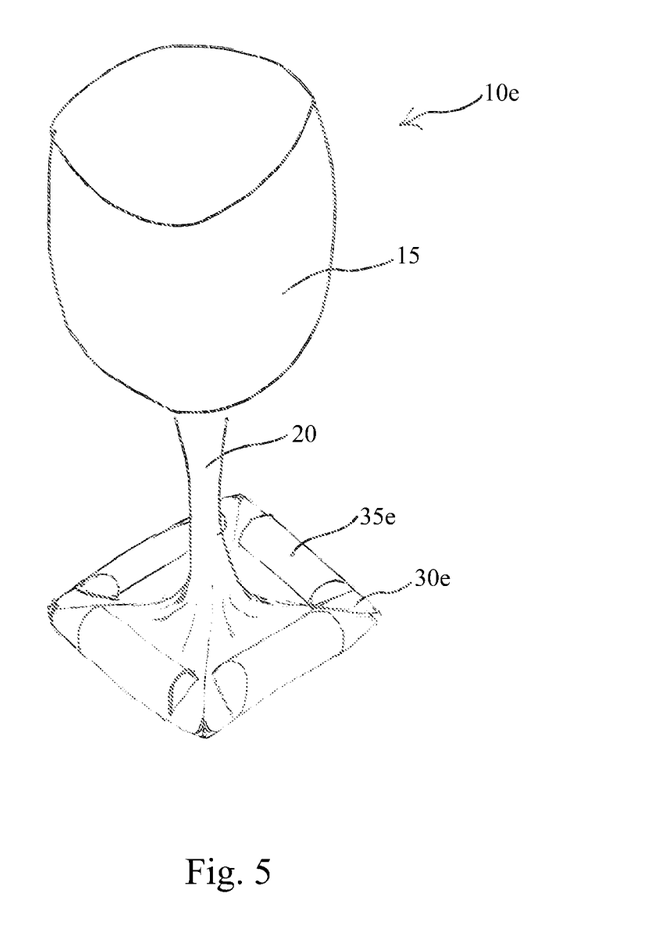
FIG. 5 is a perspective view of a fifth embodiment of a stemware product of the present disclosure.

Although FIGS. 1-4 illustrate stemware with circular bases, such bases may have any suitable shape, including, but not limited to including square, rectangular, round, oval and additional regular or irregular polygonal shapes. In particular, while the embodiment of FIG. 4 illustrates a generally cylindrical lens feature formed in a circular base, such feature may in further embodiments be advantageously employed in stemware products which have relatively straight sides (i.e., generally polygonal shapes), wherein the generally cylindrical lens portion may be aligned with a straight edge of the base. The embodiment of FIG. 5, e.g., illustrates stemware product 10e with generally cylindrical lens portions 35e formed in an approximately square base 30e. Each of lens portions 35e may be designed to provide similar or varying predetermined degrees of magnification.

Figure 6:
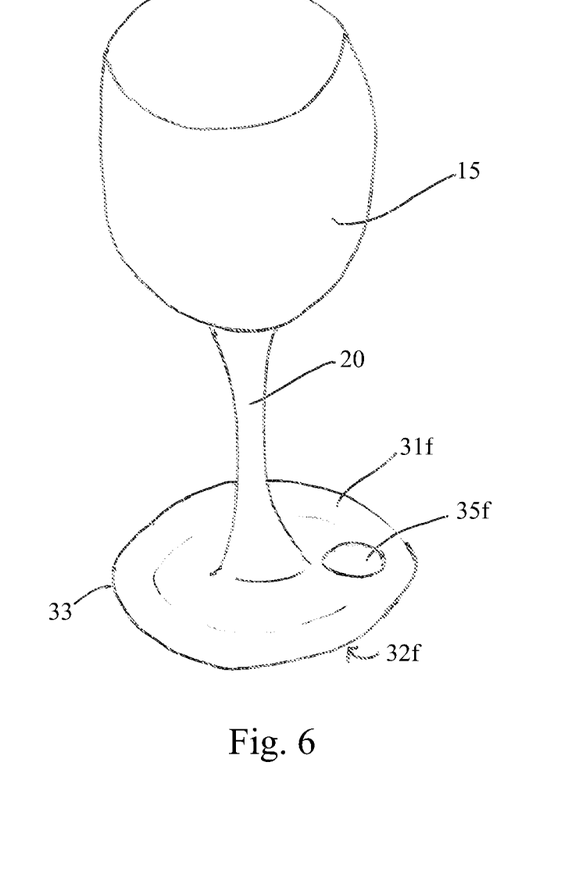
FIG. 6 is a perspective view of a sixth embodiment of a stemware product of the present disclosure.

FIG. 6 illustrates a perspective view of a further particular embodiment of a stemware product 10f, where either or both of the upper and lower surfaces 31f, 32f of the base 30f may be shaped to provide an optical surface providing a relatively lower predetermined degree of magnification over the majority of the base surface area, and a relatively higher predetermined degree of magnification over a minor portion of the base surface area such as concave lens portion 35f positioned between the periphery of the base and a central location of the base. More particularly, base 30f has opposing upper and lower primary surfaces, 31f, 32f respectively, and a periphery 33, wherein surfaces 31f and 32f are designed to include a generally convex lens portion 35f having an optical surface providing a predetermined degree of magnification positioned to provide at least one focal point under the base positioned between the periphery of the base and the central location. Such relatively higher degree of magnification lens portion 35f may be particularly advantageous, e.g., for reading fine print text such as may be found in medical prescriptions though the base of the stemware. Multiple relatively higher degree of magnification lens portions may be formed around the stem intermediate the stem and the periphery of the base, with similar or different predetermined degrees of magnification. While each of FIGS. 1-6 illustrates bases with a lower surface defining a cavity, the lower surface of the lens may instead be generally flat. The stem 20 can be integrally attached to the base 30 and may be solid or hollow.

Suitable additional stemware for use with bases as described herein (in addition to the wine glasses illustrated in FIGS. 1-6) include, but are not limited to, other stemmed drinking glasses such as margarita glasses, champagne glasses, beer glasses, martini glasses, and glass pedestal servingware and/or bowls, as well as other stemware items. Pedestal servingware may be configured as a plate such as a cake plate, or other pedestal supported containers. In certain embodiments, particularly with respect to the pedestal servingware, the base may be elongate rather than circular or regular polygonal.

Figure 7A:
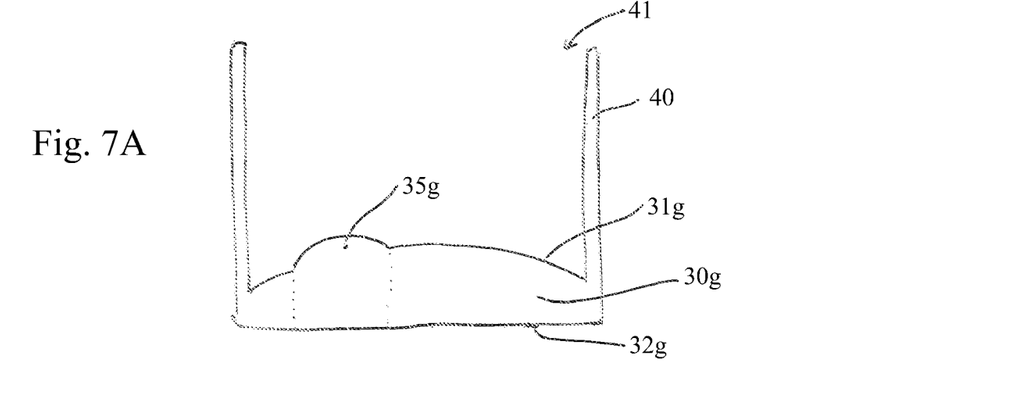
FIGS. 7A-7C are cross-sectional, top, and perspective views of a seventh embodiment of a drinkware product of the present disclosure.
Figure 7B:
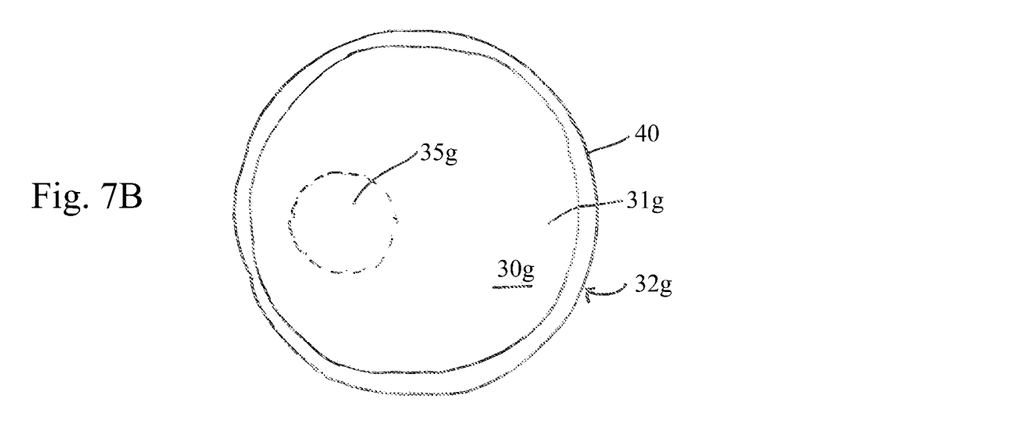
Figure 7C:
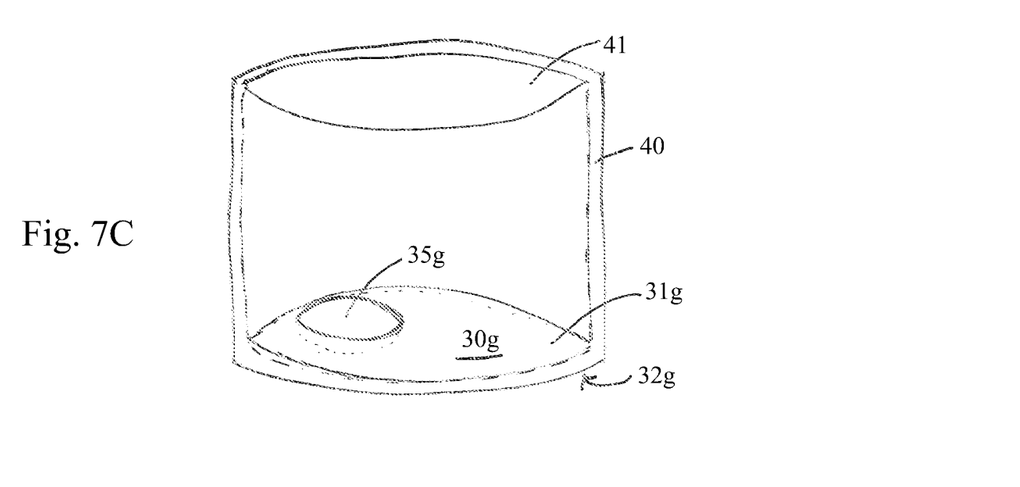

In further embodiments of the present disclosure, drinkware may be in the form of non-stemmed drinkware, as illustrated in FIGS. 7A-7C, e.g., wherein the vessel container of the drinkware is formed by the base 30g and a sidewall 41 extending up from the base along the periphery of the base, such that the base and sidewall together form the container vessel with a vessel opening 41 at the top of the sidewall. In such embodiment, the predetermined degree of magnification is provided when viewed through the vessel opening and the transparent section from the upper surface 31g of the base. The base further includes lower surface 32g.

More particularly, in various embodiments, the base may provide first and second distinct relatively lower and higher predetermined degrees of magnification at corresponding first and second focal points under the base, wherein at least one of the first and second focal points is positioned between the periphery of the base and a central location of the base when viewed through the transparent section from the upper surface of the base. The base may provide, e.g., a first relatively lower predetermined degree of magnification with a focal point under the base positioned approximately at the central location of the base as determined by upper surface 31g of the base, and a second relatively higher predetermined degree of magnification, as determined by surface of lens element 35g, with a focal point under the base positioned between the periphery of the base and a central location of the base when viewed through the transparent section from the upper surface of the base. In further specific embodiments, the first relatively lower predetermined degree of magnification provided by the majority of the surface of base 30g may be, e.g., from about 2× to about 8×, and more particularly about 6×, while the second relatively higher predetermined degree of magnification provided by lens element 35g may be from about 6× to about 15×, and more particularly about 10×. In such embodiments, the base may be shaped such that the majority of the base is in the form of a conventionally convex lens as shown for upper surface 31g in combination with lower surface 32g, to provide the first relatively lower predetermined degree of magnification over a majority of the surface of the base (e.g., 60-95% of the base surface area), and the second relatively higher predetermined degree of magnification may be provided by including a further lens element 35g over a relatively minor area (e.g., 5-40% of the base surface area) positioned between the periphery of the base and the center of the base when viewed through the transparent section from the upper surface of the base. Such relative degrees of magnification and relative positioning of the lens elements advantageously enable the drinkware with magnification base to be useful for reading very fine print through the higher magnification area (e.g., less than or equal to about 8 pt, less than or equal to about 6 pt, or even less than or equal to about 4 pt print size) which may be used in prescription labels, as well as reading more conventional reading print size (e.g., about 9 pt and higher) through the majority of the base surface area. In certain embodiments of the described drinkware, the drinkware base further may have a diameter of from about 4 cm to about 10 cm, or of from about 5 cm to about 9 cm. Such diameters may be further advantageous for enabling reading of both such fine and regular size printed matter.

Stemware and other drinkware as described herein may be formed by conventional stemware and drinkware molding procedures after generating an original mold with corresponding mold surfaces specifically designed to impart an optical surface in the resulting molded stemware or other drinkware base providing a predetermined degree of magnification when viewing through the upper surface of the base. In a further particular embodiment, stemware and other drinkware as described herein may alternatively be formed by conventional molding procedures after modifying an existing stemware or other drinkware mold.

Accordingly, in accordance with a further embodiment of the disclosure, a method of modifying a mold for fabricating a stemware product is described, the method including: selecting an existing mold for forming a selected stemware product having an upper portion, a base having upper and lower primary surfaces and a periphery, and a stem extending between the base and upper portion, where the stem is narrower than the periphery of the base and spaces the upper portion from the base such that the upper surface of the base is directly visible externally from the top portion; and modifying the existing mold to either add material to the mold or remove material from the mold to form a modified mold surface which will impart an optical surface to the base of a stemware product formed with the modified mold. Similarly, an existing mold for non-stemmed drinkware may be modified to either add material to the mold or remove material from the mold to form a modified mold surface which will impart a desired optical surface to the base of a drinkware product as described herein formed with the modified mold.

In yet a further embodiment of the disclosure, a method of forming a stemware product is described, the method comprising selecting and modifying an existing stemware mold as disclosed, and using the modified mold to form a molded stemware product comprising an upper portion, a stem, and a base having a transparent section extending through the base from an upper surface to a lower surface thereof and having an optical surface providing a predetermined degree of magnification when viewing through the transparent section from the upper surface of the base externally from the upper portion. Similarly, non-stemmed drinkware as described herein may be formed by selecting and modifying an existing drinkware mold, and forming the drinkware from the modified mold. In particular embodiments, e.g., an existing stemware or other drinkware mold for a stemware or other drinkware product having a relatively flat upper surface over at least a portion of the stemware or other drinkware base may be selected and then modified by removing material from the mold surface at the location of the mold corresponding to the relatively flat upper surface portion to result in a relatively curved optical surface providing a desired predetermined degree of magnification in the location of a molded stemware or other drinkware product corresponding to the position where material was removed from the existing stemware or other drinkware mold. Alternatively, an insert part may be added to an existing mold to reconfigure a surface of the base of a resulting molded stemware or other drinkware product to impart an optical surface providing a desired predetermined degree of magnification in the molded base. The present disclosure thus advantageously enables economical ways to generate stemware and other drinkware products as described herein with modified bases having optical surfaces providing a desired predetermined degree of magnification in transparent sections of such stemware and other drinkware bases.

In various embodiments, the stemware and other drinkware including a magnification base as described herein may further include custom decorating such as silk screening, pad printing, labeling, heat transfer, die sublimation, surface etching, hand painting, UV printing or any high temperature curing process including manual, semi-automatic or fully automatic processes.

The foregoing is illustrative of the present invention and is not to be construed as limiting thereof. Although a few exemplary embodiments have been described, those skilled in the art will readily appreciate that many modifications are possible in the exemplary embodiments without materially departing from the novel teachings and advantages of this invention. Accordingly, all such modifications are intended to be included within the scope of this invention as defined in the claims.

What is claimed:

1. A drinkware product comprising a vessel container and a base having upper and lower surfaces and a periphery;
   wherein the base includes a transparent section extending through the base from the upper surface to the lower surface and having an optical surface providing a predetermined degree of magnification when viewed through the transparent section from the upper surface of the base; and
   wherein the optical surface providing a predetermined degree of magnification is positioned to provide at least one focal point under the base positioned between the periphery of the base and a central location of the base when viewed through the transparent section from the upper surface of the base;
   wherein the drinkware product is a non-stemmed drinkware product, where the vessel container is formed by the base and a sidewall extending up from the base along the periphery of the base, such that the base and sidewall together form the container vessel with a vessel opening at the top of the sidewall;
   and wherein the predetermined degree of magnification is provided when viewed through the vessel opening and the transparent section from the upper surface of the base.

2. A drinkware product according to claim 1, wherein the base is shaped to provide first and second distinct predetermined degrees of magnification at corresponding first and second focal points under the base, wherein the second predetermined degree of magnification is higher than the first predetermined degree of magnification, and wherein at least one of the first and second focal points is positioned between the periphery of the base and a central location of the base when viewed through the transparent section from the upper surface of the base.

3. A drinkware product according to claim 2, wherein the base is shaped to provide the first predetermined degree of magnification with a focal point under the base positioned approximately at the central location of the base, and to provide the second predetermined degree of magnification with a focal point under the base positioned between the periphery of the base and a central location of the base when viewed through the transparent section from the upper surface of the base.

4. A drinkware product according to claim 3, wherein the first predetermined degree of magnification is from 2× to 8× and the second predetermined degree of magnification is from 6× to 15×, with the proviso the second predetermined degree of magnification is higher than the first predetermined degree of magnification.

5. A drinkware product according to claim 4, wherein the first predetermined degree of magnification is 6× and the second predetermined degree of magnification is 10×.

6. A drinkware product according to claim 4, wherein the base is shaped to provide the first predetermined degree of magnification over a majority of the surface of the base, and the second predetermined degree of magnification over a minor surface area of the base positioned between the periphery of the base and a central location of the base when viewed through the transparent section from the upper surface of the base.

7. A drinkware product according to claim 6, wherein the base has a diameter of at least 4 cm.

8. A stemware product comprising:
   an upper portion;
   a base having upper and lower surfaces and a periphery; and
   a stem extending between the base and upper portion, where the stem is narrower than the periphery of the base and spaces the upper portion from the base such that the upper surface of the base is directly visible externally from the upper portion;
   wherein the base includes a transparent section extending through the base from the upper surface to the lower surface and having an optical surface providing a predetermined degree of magnification when viewing through the transparent section from the upper surface of the base externally from the upper portion;
   wherein the stem is attached to the base at a central location of the upper surface of the base, and the optical surface providing a predetermined degree of magnification is positioned to provide at least one focal point under the base positioned between the periphery of the base and the central location; and wherein the optical surface providing a predetermined degree of magnification extends continuously or discontinuously around the central location to provide a plurality of focal points positioned rotationally around the central location, and wherein the optical surface providing a predetermined degree of magnification varies continuously across at least a portion of the upper visible surface of the base to provide a continuously varying predetermined degree of magnification across the upper visible surface of the base.

9. A stemware product comprising:

an upper portion;

a base having upper and lower surfaces and a periphery; and a stem extending between the base and upper portion, where the stem is narrower than the periphery of the base and spaces the upper portion from the base such that the upper surface of the base is directly visible externally from the upper portion;

wherein the base includes a transparent section extending through the base from the upper surface to the lower surface and having an optical surface providing a predetermined degree of magnification when viewing through the transparent section from the upper surface of the base externally from the upper portion;

wherein the stem is attached to the base at a central location of the upper surface of the base, and the optical surface providing a predetermined degree of magnification is positioned to provide at least one focal point under the base positioned between the periphery of the base and the central location; and wherein the optical surface providing a predetermined degree of magnification defines a generally cylindrical lens portion positioned to provide a focal line segment positioned between the periphery of the base and the central location.

10. A stemware product according to claim 8, wherein the stemware is formed of glass, wherein the upper portion comprises an upper container vessel connected to the stem, and wherein the product is a stemmed beverage glass.

11. A stemware product according to claim 8, wherein the stemware is formed of glass, wherein the upper portion comprises an upper container vessel connected to the stem, and wherein the product has an integral glass stem, base and container.

12. A stemware product according to claim 8, wherein the optical surface comprises the lower primary surface of the base.

13. A stemware product according to claim 8, wherein the optical surface comprises the upper primary surface of the base.

14. A method of modifying a mold for fabricating a stemware product, the method comprising:

selecting an existing mold for forming a selected stemware product having an upper portion, a base having upper and lower primary surfaces and a periphery, and a stem extending between the base and upper portion, where the stem is narrower than the periphery of the base and spaces the upper portion from the base such that the upper surface of the base is directly visible externally from the upper portion; and modifying the existing mold to either add material to the mold or remove material from the mold to form a modified mold surface which will impart a reconfigured optical surface to the base of a stemware product formed with the modified mold, wherein the reconfigured optical surface is changed from a surface obtained from the selected existing mold prior to such modification to provide an added predetermined degree of magnification to the reconfigured optical surface.

15. A method according to claim 14, further comprising:

using the modified mold to form a molded stemware product comprising an upper portion, a stem, and a base having a transparent section extending through the base from an upper surface to a lower surface thereof and having an optical surface providing a predetermined degree of magnification when viewing through the transparent section from the upper surface of the base externally from the upper portion.

* * * * *